US010171397B2

(12) United States Patent
Della Corte et al.

(10) Patent No.: US 10,171,397 B2
(45) Date of Patent: Jan. 1, 2019

(54) SHARING OF INFORMATION EXTRACTED FROM MESSAGES IN COLLABORATIVE SYSTEMS

(71) Applicant: International Business Machines Corporation, Armonk, NY (US)

(72) Inventors: Gianluca Della Corte, Rome (IT); Alessandro Donatelli, Rome (IT); Antonio M. Sgro, Fiumicino (IT)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 14/693,919

(22) Filed: Apr. 23, 2015

(65) Prior Publication Data

US 2016/0315894 A1    Oct. 27, 2016

(51) Int. Cl.
*H04L 12/58* (2006.01)

(52) U.S. Cl.
CPC .............. *H04L 51/14* (2013.01); *H04L 51/32* (2013.01)

(58) Field of Classification Search
CPC ................................. H04L 51/14; H04L 51/16
See application file for complete search history.

(56) References Cited

U.S. PATENT DOCUMENTS

| | | | |
|---|---|---|---|
| 6,471,521 B1 | 10/2002 | Dornbush et al. | |
| 7,418,437 B1 | 8/2008 | Marks | |
| 7,606,865 B2 | 10/2009 | Kumar et al. | |
| 8,516,379 B2 | 8/2013 | D'Angelo et al. | |
| 2004/0191748 A1 | 9/2004 | Thean et al. | |
| 2005/0223061 A1* | 10/2005 | Auerbach | G06Q 10/107 709/206 |
| 2006/0286530 A1* | 12/2006 | Forrest | G09B 7/02 434/323 |
| 2008/0244008 A1* | 10/2008 | Wilkinson | G06F 17/30545 709/205 |
| 2010/0250131 A1* | 9/2010 | Relyea | G01C 21/20 701/469 |
| 2011/0161445 A1* | 6/2011 | Nelke | H04L 51/04 709/206 |
| 2011/0184937 A1* | 7/2011 | Jin | G06Q 10/107 707/722 |
| 2011/0282855 A1* | 11/2011 | Ronen | G06F 17/30637 707/706 |

(Continued)

FOREIGN PATENT DOCUMENTS

WO    2013003100 A2    1/2013

OTHER PUBLICATIONS

Jain et al., "Designing Incentives for Online Question and Answer Forums", EC'09, Jul. 6-10, 2009, Stanford, California, Copyright 2009 ACM, pp. 1-10.

*Primary Examiner* — June Y Sison
(74) *Attorney, Agent, or Firm* — Michael A. Petrocelli (57) ABSTRACT

A method includes intercepting a message sent from a computing machine of a first user to at least one second user, analyzing a content of the message to identify each matching context of one or more known contexts matching the content of the message, generating at least one shared entry for each matching context according to information corresponding to the matching context extracted from the message, and submitting each shared entry for publication to at least one collaborative system corresponding to the matching context of the shared entry.

17 Claims, 6 Drawing Sheets

(56) References Cited

U.S. PATENT DOCUMENTS

| | | |
|---|---|---|
| 2012/0042266 A1 | 2/2012 | Sotropa |
| 2012/0210247 A1* | 8/2012 | Khouri ................. G06Q 10/101 |
| | | 715/751 |
| 2013/0007037 A1* | 1/2013 | Azzam .............. G06F 17/30654 |
| | | 707/769 |
| 2013/0138428 A1* | 5/2013 | Chandramouli ...... G06F 17/274 |
| | | 704/9 |

* cited by examiner

SHARING OF INFORMATION EXTRACTED FROM MESSAGES IN COLLABORATIVE SYSTEMS

BACKGROUND

The present disclosure relates to the information technology field. More specifically, this disclosure relates to collaborative systems.

Collaborative systems are commonly used in a computing infrastructure by persons involved in common tasks to collaborate among them for achieving their goals (for example, to facilitate team working in modern organizations). Particularly, the collaborative systems may be used to share information publicly in a community of persons (for example, technical information in the same organization); this substantially increases the transfer of knowledge, skill and expertize from the personal experience of each person to the rest of the community.

A typical example is a forum, which is a particular type of online service where a community of persons (participants) may take part in discussions about topics of common interest; for this purpose, each participant may submit digital messages (referred to as posts) to the forum. The posts are published in the forum (for example, organized in chronological order within discussion threads relating to corresponding topics); any (authorized) person may browse the forum to collect information (for example, to acquire a basic knowledge about a topic or to obtain a historical perspective on trends and opinions relating thereto).

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of sharing information derived from messages in collaborative systems.

Particularly, an aspect provides a method for sharing information in a computing infrastructure; the method comprises intercepting a message sent from a computing machine of a first user to at least one second user, analyzing a content of the message to identify each matching context of one or more known contexts matching the content of the message, generating at least one shared entry for each matching context according to information corresponding to the matching context extracted from the message, and submitting each shared entry for publication to at least one collaborative system corresponding to the matching context of the shared entry.

A further aspect provides a computer program for performing the method, and a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Currently effective sharing of information may be hindered by several factors. Particularly, the submission of a post to a forum may be time consuming since it generally entails a number of relatively long manual operations (for example, logging into the forum, selecting a relevant thread, typing the post and then appending it to the thread). This may discourage the submission of the posts (especially when the persons are busy), with a detrimental effect on the sharing of information.

On the other hand, communication systems may be commonly used to exchange information privately among the persons. A typical example is an e-mail service, which may allow each person to send digital messages (referred to as e-mails) to one or more selected other persons over a communication network (typically based on the Internet). This may allow communicating anywhere in the world, thereby conveying information in a direct and immediate way.

However, the information exchanged via the e-mails remains confined to the corresponding persons (sender and recipient). Therefore, access to this information may be limited to the (few) persons expressly selected by the sender; conversely, a too extensive distribution of the e-mails may cause a flood of information of modest (if not null) usefulness.

Figure 1:
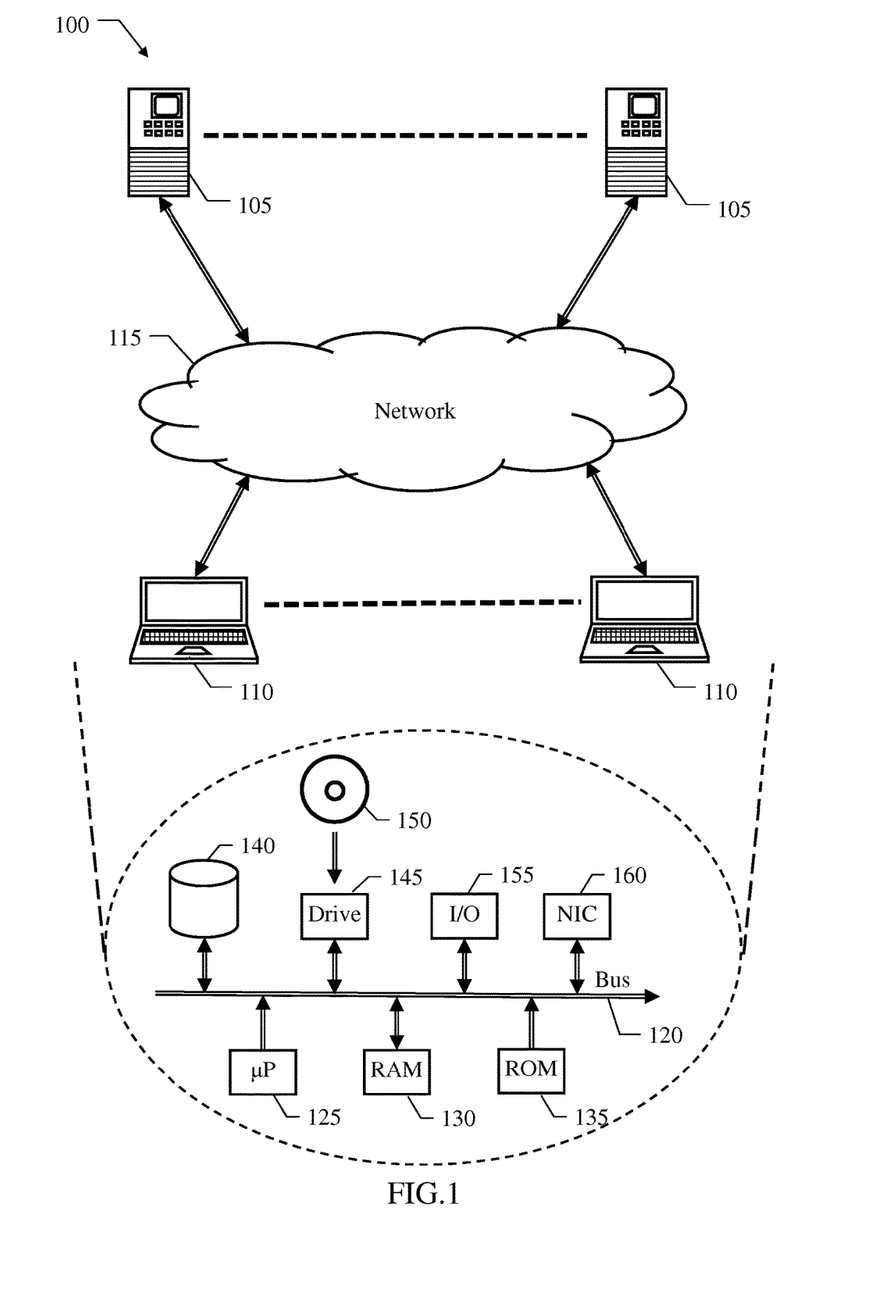
FIG. 1 shows a schematic block-diagram of a computing infrastructure wherein the solution according to an embodiment of the present disclosure may be applied.

Referring now to FIG. 1, a schematic block-diagram is shown of a computing infrastructure 100, according to an embodiment of the present disclosure.

The computing infrastructure 100 is based on a client/server model, in which one or more server computing machines (or simply servers) 105 may provide services to a plurality of client computing machines (or simply clients) 110. Typically, the computing infrastructure 100 has a distributed architecture that may allow the servers 105 (for example, of one or more data centers, not shown in the figure) and the clients 110 (for example, of corresponding persons, or users) communicate among them over a network 115 (for example, Internet based). In the specific case at issue, one or more of the servers 105 may operate as e-mail servers for offering an e-mail service to corresponding users of the clients 110; moreover, one or more of the servers 105 operate as forum servers for hosting (online) forums that may be accessed by the users of the clients 110.

Each computing machine (client or server) 105,110 of the above-mentioned computing infrastructure 100 may include several units that may be connected in parallel to a bus structure 120 (with its architecture that may be suitably scaled according to the actual function of the computing machines 105,110 in the computing infrastructure 100). In detail, one or more microprocessors (μP) 125 may control operation of the computing machines 105,110; a RAM 130 may be directly used as a working memory by the microprocessors 125, and a ROM 135 stores basic code for a bootstrap of the computing machine 105,110. The computing machine 105,110 also may have a mass-memory including one or more hard-disks 140 (for example, provided by storage units of their data centers for the servers 105), drives 145 for reading/writing removable storage units 150 (for example, optical disks) and input/output (I/O) units 155 such as a keyboard, a mouse, and a monitor (for example, provided by a console of their data centers for the servers 105). The computing machines 105,110 may be equipped with a network adapter 160, which is used to access the network 115 (and to plug the servers 105 into their data centers).

Figure 2A:
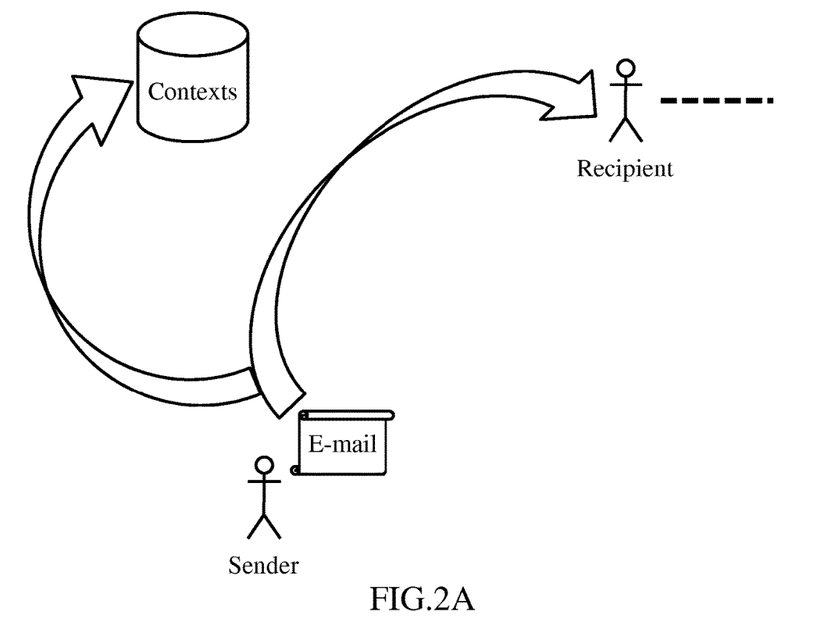
FIG. 2A-FIG. 2C show a pictorial representation of an exemplary scenario of application of the solution according to an embodiment of the present disclosure.
Figure 2B:
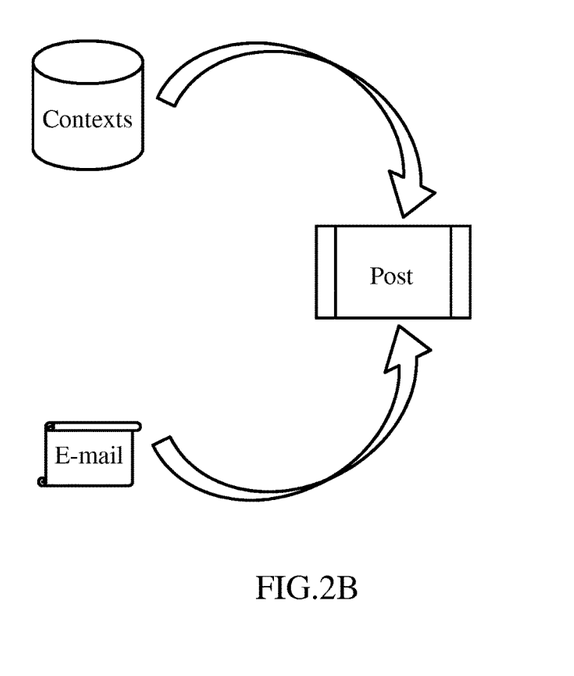
Figure 2C:
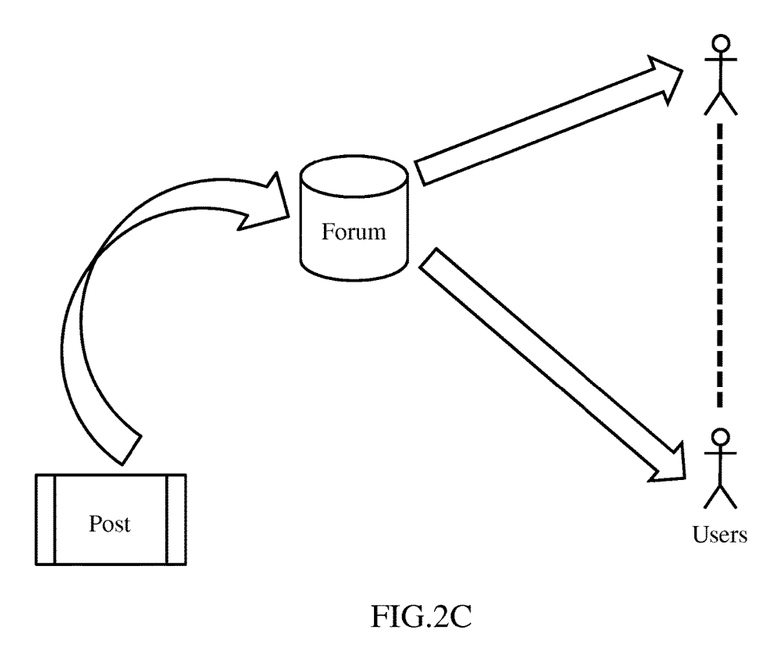

With reference to FIG. 2A-FIG. 2C, a pictorial representation is shown of an exemplary scenario of application of the solution according to an embodiment of the present disclosure.

Referring now to FIG. 2A, a generic user (sender) may send an e-mail to one or more another users (recipients); the e-mail may be sent from the client of the sender, in order to be received on the client of each recipient (not shown in the figure).

In the solution according to an embodiment of the present disclosure, the e-mail may be intercepted during its sending (for example, on the corresponding e-mail server). A content of the e-mail may be analyzed against one or more pre-defined known contexts, in order to identify each matching context thereof that may match the content of the e-mail (for example, a specific software product when the e-mail contains technical information relating thereto).

Referring now to FIG. 2B, information corresponding to each matching context may be extracted from the e-mail (for example, an answer returned in the e-mail as a reply to a question about the software product submitted in a previous e-mail that is quoted inline). A post (or more) may then be generated according to the extracted information (for example, in the form of a question and answer).

Referring now to FIG. 2C, each post may be submitted for publication to a forum (or more) corresponding to the matching context of the post (for example, a forum of technical support for the software product to which the question and answer relate). As a result, each (authorized) user of the forum may access this post from his/her client (not shown in the figure).

In this way, information that is exchanged (privately) with the e-mails among specific users may be made available (publicly) in the forums to a community of users (for example, all the employees of a same organization); this may allow enriching the forums with information that otherwise would remain confined to the senders and the recipients of the e-mails (so as to be available when necessary, without flooding the users with useless information).

This may be achieved substantially in an automatic way, with reduced (or none at all) manual operations by the users, so as to be almost opaque thereto (and especially to their productivity).

Particularly, the information extracted from the e-mails may be added to forums corresponding to their contexts; therefore, this may significantly increase its usability. Moreover, the information extracted from the e-mails may be used to enrich forums used by broad communities, so as to allow other users (even different from the ones involved in the exchange of the e-mails) to leverage this information.

The above described solution may significantly foster the sharing of information (for example, resulting in valuable competitive advantages for any organization implementing it).

Figure 3:
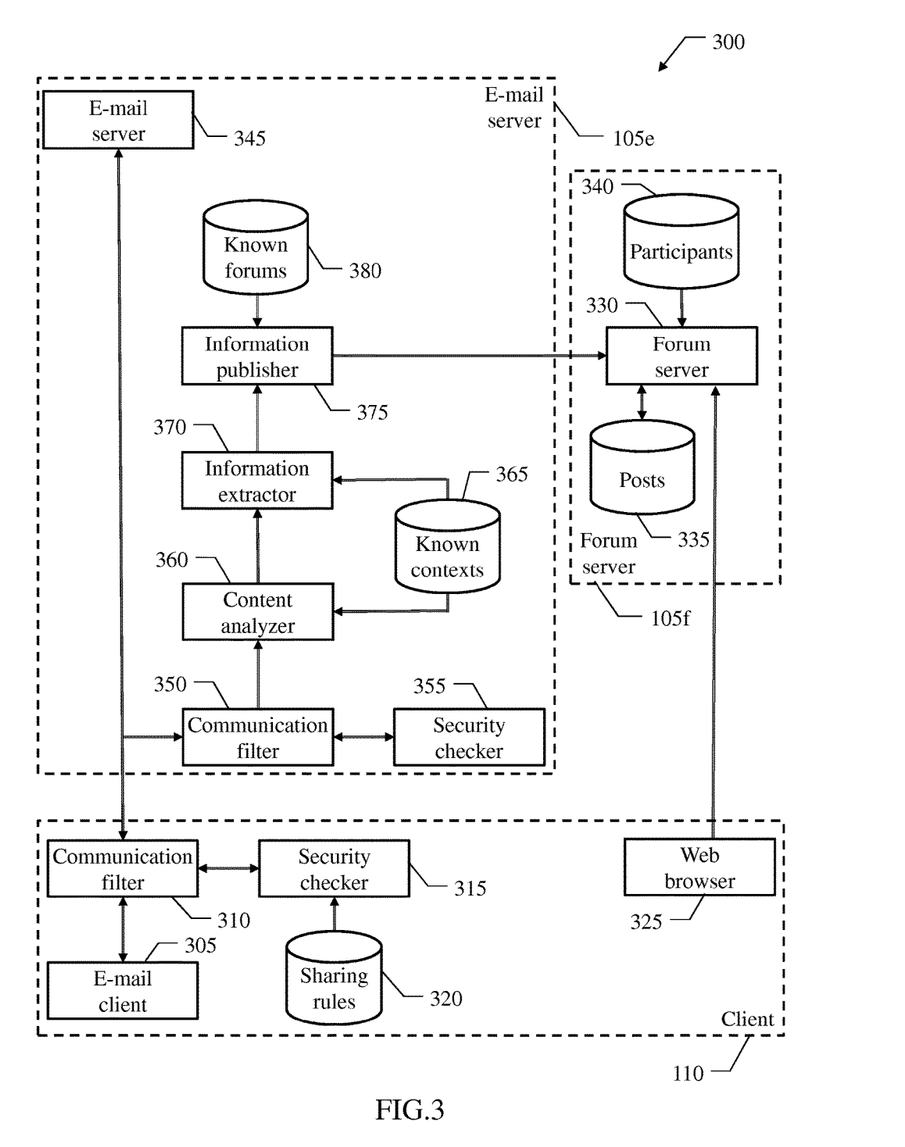
FIG. 3 shows the main software components that may be used to implement the solution according to an embodiment of the present disclosure.

With reference now to FIG. 3, main software components that may be used to implement the solution described above are shown according to an embodiment of the present disclosure.

All the software components (programs and data) are denoted as a whole with the reference 300. The software components 300 may typically be stored in the mass memory and loaded (at least partially) into the working memory of the corresponding computing machines when the programs are running. The programs may be initially installed into the mass memory, for example, from removable storage units or from the Internet. In this respect, each software component may represent a module, segment or portion of code, which may include one or more executable instructions for implementing the specified logical function.

Particularly, each client 110 (only one shown in the figure) may run an e-mail client 305. The e-mail client 305 may be used to manage the e-mails of the corresponding user locally. As far as relevant to the present disclosure, the e-mail client 305 may be used to compose and send (outgoing) e-mails to other users and to receive (ingoing) e-mails from other users via the corresponding e-mail server, only one shown in the figure and differentiated with the reference 105*e*.

In the solution according to an embodiment of the present disclosure, a (client) communication filter 310 may be interposed between the e-mail client 305 and the e-mail server 105*e* for intercepting each e-mail before it is submitted thereto (for example, with hooking techniques). The communication filter 310 may exploit a (client) security checker 315, which verifies a sharing permission for sharing the information contained in the e-mails. For this purpose, the security checker 315 accesses a sharing rule repository 320, which may store one or more sharing rules defining policies for the sharing of information (for example, customizable by the user of the client 110 starting from a default sharing rule preventing any sharing of information).

The client 110 may further run a web browser 325, which may be used to browse web pages in the Internet; particularly, as far as relevant to the present disclosure, the web browser 325 may be used to access one or more forums hosted on corresponding forum servers, only one shown in the figure and differentiated with the reference 105*f*; particularly, the web browser 325 may allow accessing the forums to submit posts and to read (discussion) threads including collections of posts relating to corresponding topics.

Moving to the (computing machine) forum server 105, it may run a (software program) forum server 330 (or more) that manages a corresponding forum allowing sharing information among the users of the clients 110; particularly, the forum server 330 may accept posts submitted by authorized users of the clients 110 that may be registered with it, whereas it may generally allow browsing its content indiscriminately by any users of the clients 110. For this purpose, the forum server 330 may control a post repository 335 that stores all the posts that have been submitted to the forum server 330 (organized in the corresponding threads), and a participant repository 340 that stores information about users registered as participants to the forum (for example, identifier, password and privileges of the participants classified as members that may only submit posts, moderators that control corresponding threads and administrators that control the whole forum).

Moving to the (computing machine) e-mail server 105e, it may run a (software program) e-mail server 345 that manages the exchange of e-mails among the users of the clients 110 registered with it; particularly, the e-mail server 345 may accept the e-mails submitted by the senders (uploaded from their clients 110) and deliver them to the corresponding recipients (for their downloading to their clients 110).

In the solution according to an embodiment of the present disclosure, a (server) communication filter 350 may be associated with the e-mail server 345 for intercepting each e-mail received from the clients 110. The communication filter 350 may exploit a (server) security checker 355, which may verify the permission to share the information contained in the e-mails. The communication filter 350 may control a content analyzer 360, which may analyze the content of each e-mail (whose information may be shared) to identify any matching context thereof; for this purpose, the content analyzer 360 may access a context repository 365 that stores a definition of all the known contexts. The content analyzer 360 in turn may control an information extractor 370, which may extract information corresponding to any matching context from each e-mail and may generate a corresponding post accordingly; for this purpose, the information extractor 370 may access the same context repository 365. The information extractor 370 in turn may control an information publisher 375 that may submit each post so generated to the forum server 330 of each corresponding forum; for this purpose, the information publisher 375 may access a forum repository 380 that may store an indication of one or more characteristics of known forums with which the e-mail server 105e may be registered as a member.

Figure 4:
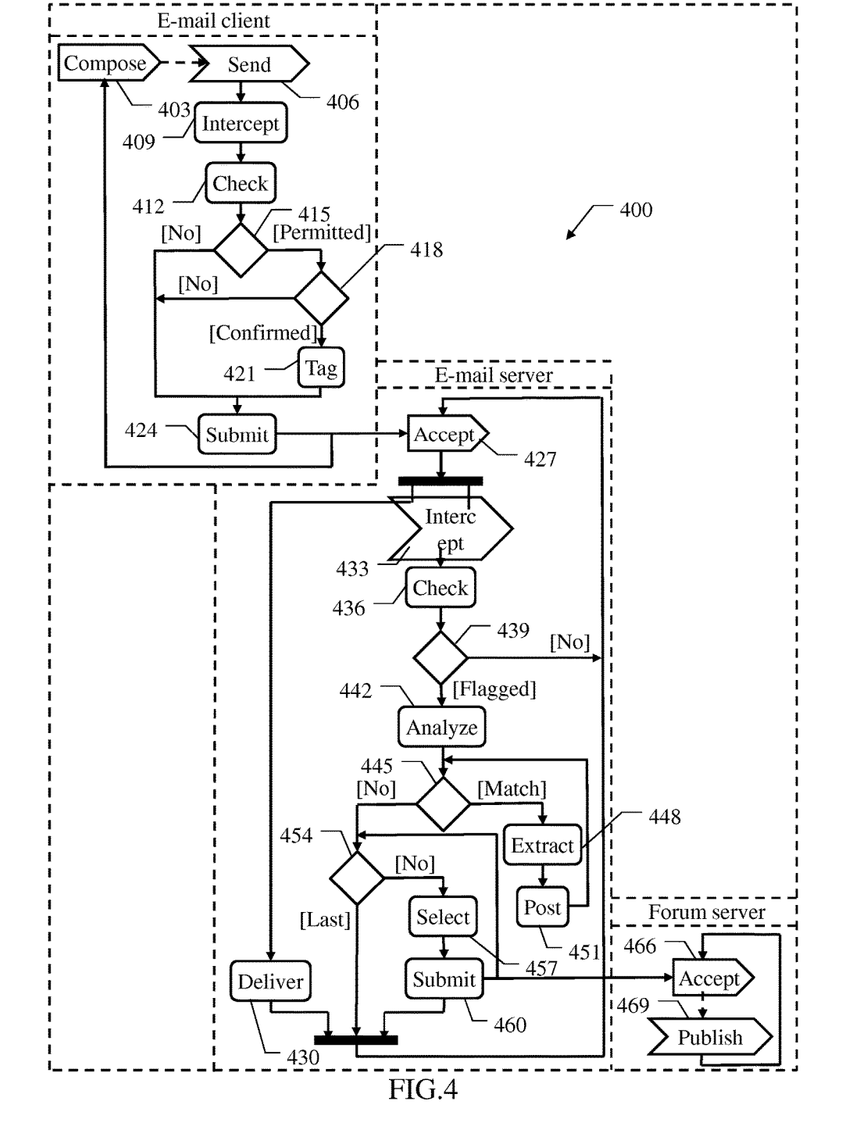
FIG. 4 shows an activity diagram describing the flow of activities relating to an implementation of the solution according to an embodiment of the present disclosure.

With reference now to FIG. 4, an activity diagram is shown describing the flow of activities relating to an implementation of the solution according to an embodiment of the present disclosure.

Particularly, the diagram may represent an exemplary process for sharing information in the above-described computing infrastructure with a method 400. In this respect, each block may represent one or more executable instructions for implementing the specified logical function on the corresponding computing machine.

Starting from the swim-lane of a generic e-mail client, the process enters block 403 whenever the corresponding user (sender) wishes to compose a (new) e-mail. For this purpose, the sender may create the e-mail from scratch or by forwarding/replying to a previous e-mail that has been received from another user (by selecting corresponding commands provided by the e-mail client). In any case, a composing window may be opened for allowing the sender to compose the e-mail. Particularly, the composing window may include a body pane for entering the content of the e-mail. The body pane may be empty (apart from a possible pre-defined signature of the sender) when the e-mail is created from scratch; instead, when the e-mail is created by forwarding/replying to a previous e-mail, the e-mail client may automatically include a copy of the previous e-mail into the body pane (for example, below the signature). In any case, the sender may then enter the desired information (for example, text) into the body pane. Particularly, in case of forwarding/replying to a previous e-mail this may create a (conversation) thread where related e-mails may be visually grouped (for example, in a chain or a hierarchical structure); in this way, the overall structure of a conversation may be quickly appreciated (for example, for one or more questions and corresponding answers). Moreover, the user may enter an email address of each (main and possible cc) recipient of the e-mail (for example, in corresponding input boxes)—in addition or in alternative to the ones that are automatically added when the e-mail is created by forwarding/replying to a previous e-mail. Once the composition of the e-mail has been completed, the process may continue to block 406 as soon as the sender selects a command of the e-mail client for sending the e-mail; in response thereto, the e-mail client submits the e-mail to the corresponding e-mail server (as indicated in its configuration) and then saves the e-mail into an outbox thereof.

The (client) communication filter may intercept this (outgoing) e-mail at block 409. Continuing to block 412, the communication filter may cause the (client) security checker to verify the sharing permission for sharing the information contained in the e-mail according to the sharing rules; for example, the sharing rules may indicate that the sharing of information is permitted only for e-mails addressed to specific recipients (such as colleagues of the same organization). The flow of activity branches at block 415 according to a result of this verification. If the sharing of information is permitted, the security checker at block 418 may prompt the sender to give his/her consensus thereto (for example, by displaying a corresponding pop-up window). If the sender confirms the sharing of information (or if the security checker is configured to confirm the sharing of information automatically without requiring any manual intervention by the sender), the security checker at block 421 may add a sharing indicator to the e-mail; for example, the sharing indicator is a (custom) sharing tag that is added to a header of the e-mail. The process then descends into block 424; the same point may also be reached directly (without adding any sharing tag to the e-mail) from the block 415 when the sharing of information may not be permitted or from the block 418 when the sharing of information may not be confirmed. In any case, the communication filter now actually may submit (dispatch) the e-mail, with or without the sharing tag, to the e-mail server. The process then may return to the block 403 waiting for the composition of a further e-mail.

Moving to the swim-lane of a generic e-mail server, it is listening at block 427 for any (outgoing) e-mail that may be submitted thereto by the different e-mail clients. As soon as a (new) e-mail is received, the e-mail server (assuming that the corresponding sender is correctly authenticated) may accept the e-mail. The e-mail server at block 430 may deliver the e-mail to each corresponding recipient (for example, for its downloading to the corresponding e-mail client). The process then returns to the block 427 waiting for the submission of a further e-mail.

At the same time, the (server) communication filter may intercept the e-mail at block 433 (for example, after it has been accepted by the e-mail server). Continuing to block 436, the communication filter may cause the (server) security checker to verify whether the e-mail contains the sharing tag in its header. The flow of activity may branch at block 439 according to a result of this verification. If the e-mail does not contain the sharing tag (meaning that the information contained in the e-mail may not be shared), the process may return to the block 427 directly without performing any additional operation. Conversely, when the e-mail contains the sharing tag (instead meaning that the information contained in the e-mail may be shared), the process may descend into block 442 where the communication filter may cause the content analyzer to analyze the content of the e-mail against the known contexts (for example, different software products and different areas of interest for each software product, such as programming, installation, support). Particularly, each known context may be defined by one or more keywords; the content analyzer may implement an analytics engine based on a language processor, which may calculate a matching index for each known context according to the corresponding keywords comprised in a body of the e-mail. The content analyzer may set each known context whose matching index is (possibly strictly) higher than a threshold value (for example, 0.6-0.8 for matching indexes ranging from 0 to 1) as a matching context of the e-mail. The content analyzer may pass an indication of all the matching contexts so identified (if any) to the information extractor; a test may then be performed at block 445, wherein the information extractor may verify whether all the matching contexts have been processed. If not, for a (current) matching context (starting from a first one, for example, in decreasing order of their matching indexes) the information extractor at block 448 may extract information corresponding to the matching context from the content of the e-mail; for example, the information extractor may implement a text parser, which may extract a question and a corresponding answer (or more) relating to the matching context from the body of the e-mail. The information extractor at block 451 may generate a corresponding precursor (i.e., forum independent) post (for example, comprising the question and answer). The process then may return to the block 445 to repeat the same operations for a next matching context (if available).

With reference again to the block 445, the flow of activity may descend into block 454 as soon as all the matching contexts have been processed to generate the corresponding (precursor) posts (or immediately when no matching context had been found). At this point, the information extractor may pass an indication of all the posts so generated (if any) to the information publisher; a test may then be performed, in which the information publisher may verify whether all the posts have been processed. If not, for a (current) post (starting from a first one, for example, in decreasing order of the corresponding matching indexes) the information publisher at block 457 may select one or more corresponding forums according to a comparison between one or more characteristics of the post and one or more characteristics of the known forums. For example, the post is defined by its language, matching context and complexity, and each one of the known forums is defined by its language, topics and type of participants. The information publisher may be based on a classification engine that may calculate a relevance index of the post for each topic of each known forum according to the corresponding characteristics; for example, the information publisher may calculate a relevance index as a (normalized) weighted sum of relevance parameters based on corresponding characteristics of the post and of the topic of the known forum, such as a relevance parameter depending on the language of the post and the language of the known forum (such as high when they are the same, medium when English is the language of the post but not of the known forum, and low otherwise), a relevance parameter depending on the matching context of the post and the topic of the known forum (such as high for the same software product and area of interest, medium for the same software product but different area of interest, and low otherwise) and a relevance parameter depending on the complexity of the post and the type of participants of the known forum (such as high for a simple post when the known forum is for end users or for a specialist post when the known forum is for experts, or low otherwise). At this point, the information publisher may select each topic of each known forum whose relevance index is (possibly strictly) higher than a threshold value (for example, 0.6-0.8 for relevance indexes ranging from 0 to 1). Continuing to block 460, the information publisher may format the post for each selected forum, if any (for example, by enclosing its content into a block providing an indication of the topic and details of the member of the selected forum associated with the e-mail server); the information publisher then may submit each (formatted) post to each selected topic of the corresponding selected forum (for example, by using credentials of the member associated with the e-mail server). The process then may return to the block 454 to repeat the same operations for a next post (if available). With reference again to the block 454, the process may return to the block 427 as soon as all the posts have been processed for their publication (or immediately when no post had been generated).

Moving to the swim-lane of a generic forum server, it is listening at block 466 for any post that may be submitted thereto by the different web browsers. As soon as a (new) post is received, the forum server (assuming that the corresponding participant is correctly authenticated) may accept the post by adding an indication of the day/time of its submission. The forum server at block 469 may publish the post by appending it to the thread of the corresponding topic of the forum. The process then may return to the block 466 waiting for the submission of a further post.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for sharing information in a computing infrastructure. However, the information may be of any nature (for example, of technical, commercial, medical, touristic type) and in any form (for example, text, images); moreover, the computing infrastructure may be of any type (for example, a private LAN of an organization).

In an embodiment, the method may include intercepting a message sent from a computing machine of a first user to at least one second user. However, the message may be of any type (see below) and it may be intercepted in any way (for example, with wrapping techniques); moreover, the message may be sent from any computing machine (for example, a tablet, a smart-phone) to any number and type of users (for example, in blind carbon copy). More generally, this may apply to any message where a piece of information is sent to one or more specific recipients that are selected individually by the sender.

In an embodiment, the method may include analyzing a content of the message to identify each matching context of one or more known contexts matching the content of the message. However, the known contexts may be in any number and of any type; more generally, each known context may relate to a corresponding argument (for example, generic subjects such as software, hardware, business, medicine, tourism, specific items or categories thereof such single products or product types, or particular aspects thereof, such as functions, operations); moreover, the content of the message may be analyzed in any way (for example, with fuzzy logic techniques) to identify any number of matching contexts (down to a single one at most, for example, with the highest matching index); more generally, each matching context is identified by the presence of correlated parts of the message referring to the corresponding argument.

In an embodiment, the method may include generating at least one shared entry for each matching context according to information corresponding to the matching context extracted from the message. However, the shared entry may be of any type according to each collaborative system to which it has to be submitted (for example, a text file, an e-mail, even not in the form of a question and answer); moreover, the shared entry may be generated in any way (down to simply copy the entire content of the message) according to any information (for example, text and/or images) extracted from the message in any way (for example, again with fuzzy logic techniques, even based on two or more correlated messages and conditioned on a manual confirmation).

In an embodiment, the method may include submitting each shared entry for publication to at least one collaborative system corresponding to the matching context of the shared entry. However, the collaborative systems may be of any type (see below), whose access may also be limited to its participants only; moreover, the collaborative systems may be in any number (down to a single one at most) and selected in any way according to the matching context of the shared entry (see below). More generally, this applies to any collaborative system where a piece of information is made available to users of a corresponding community, i.e., which may not be selected individually when the piece of information is submitted.

In an embodiment, the method may include verifying a sharing permission for sharing the content of the message. However, the sharing permission may be verified in any way (see below).

In an embodiment, the method may include conditioning said step of analyzing a content of the message, said step of generating at least one shared entry and said step of submitting each shared entry to a result of the verification of the sharing permission. However, the sharing of information may be conditioned in any way (see below); in any case, a basic implementation where the sharing of information is always allowed or prevented is contemplated.

In an embodiment, said step of verifying a sharing permission may include verifying a sharing indicator comprised in the message. However, the sharing indicator may be of any type (for example, a specific command, an asserted flag); more generally, the sharing permission may be verified in different ways, even without the addition of any information to the message (for example, when the verification of the sharing permission and the operations to be conditioned accordingly are performed on the same computing machine).

In an embodiment, the method may include adding the sharing indicator to the message before a sending thereof to said at least one second user. However, the sharing indicator may be associated with the message in any way (for example, in a command used to submit it).

In an embodiment, said step of adding the sharing indicator may include adding the sharing indicator to the message according to one or more sharing rules. However, the sharing rules may be in any number and of any type (for example, based on a content of the message, such as defined by keywords indicative of sensitive information).

In an embodiment, said step of adding the sharing indicator may include adding the sharing indicator to the message according to a sharing command submitted by the first user. However, the sharing command may be submitted in any way (for example, with different commands for sending the message with or without sharing its information).

More generally, the addition of the sharing indicator may be performed only automatically according to the sharing rules, only manually by the user or in any combination thereof; similar considerations (i.e., the sharing rules and the sharing command) apply when the sharing permission is verified in different ways (even without the addition of any sharing indicator).

In an embodiment, said step of submitting each shared entry for publication may include selecting said at least one collaborative system for each shared entry from a plurality of known collaborative systems. However, the known collaborative systems may be in any number and they may be selected in any way (see below); in any case, a basic implementation where the shared entries are always published in a pre-defined collaborative system (or more) corresponding to the known context(s) is not excluded.

In an embodiment, said step of selecting said at least one collaborative system for each shared entry may include selecting said at least one collaborative system according to a comparison between one or more characteristics of the shared entry and one or more characteristics of each kwon collaborative system. However, the characteristics of the shared entry and of the known collaborative systems may be of any type (see below); moreover, the collaborative systems may be selected (at most or always) in any number (down to a single one, for example, with the highest relevance index) and in any way (for example, with fuzzy logic techniques).

In an embodiment, the characteristics of each shared entry may include a language, the matching context and/or a complexity of the shared entity and the characteristics of each known collaborative system may include a further language, a topic and/or a type of participants of the known collaborative system. However, the characteristics of the shared entry and/or of each known collaborative system may be in any number and of any type (for example sender of the corresponding message, category of the known collaborative system), each one defined by any numerical indicator, either of continuous or discrete type (for example, based on geographical information, confidentiality considerations).

In an embodiment, the message is an e-mail. However, the message may be of additional, alternative or different type (for example, an instant message).

In an embodiment, the message may include a conversation thread. However, nothing prevents applying the same solution to simple messages created from scratch.

In an embodiment, said at least one collaborative system may include at least one online forum. However, the collaborative systems may be of additional, alternative or different types (for example, blogs, bulletin boards, mailing lists, newsgroups, Wikis).

In an embodiment, said at least one collaborative system may include at least one discussion thread of each of said at least one online forum. However, the discussion threads may be of any type (for example, as above relating to generic subjects, specific items or categories thereof, or particular aspects thereof); in any case, the collaborative systems may also be defined at the level of whole forums.

In any case, the above-mentioned steps may be performed at different locations; for example, these steps may be performed all on the e-mail server (such as when a new e-mail is composed and sent directly on the e-mail server via a web interface), all on the e-mail client (such as when the e-mail client is configured for submitting the posts using the credentials of the corresponding user), or partially on both of them.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment may provide a computer program configured for causing a computing system to perform the above-mentioned method when the computer program is executed on the computing system.

An embodiment may provide a computer program product for sharing information in a computing infrastructure, the computer program product including a computer readable storage medium having program instructions embodied therewith, the program instructions executable by a computing system to cause the computing system to perform the same method.

The computer program may be implemented as a stand-alone module, as a plug-in for a pre-existing software (for example, the e-mail client and/or the e-mail server), or even directly in the latter. Alternatively, the same solution may also be deployed as a service that is accessed through a network (such as in the Internet).

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge central systems. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or central system. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment may provide a system including means configured for performing the steps of the above-mentioned method.

An embodiment may provide a system for sharing information in a computing infrastructure. The system may include a communication filter for intercepting a message sent from a computing machine of a first user to at least one second user. The system may include a content analyzer for analyzing a content of the message to identify each matching context of one or more known contexts matching the content of the message. The system may include an information extractor for generating at least one shared entry for each matching context according to information corresponding to the matching context extracted from the message. The system may include an information publisher for submitting each shared entry for publication to at least one collaborative system corresponding to the matching context of the shared entry.

The method may also be carried out on a system based on a different architecture (for example, a local, wide area, global, cellular or satellite network), and exploiting any type of (wired and/or wireless) connections. However, its implementation on a stand-alone computer (with multiple terminals for its users) is not excluded.

Generally, similar considerations may apply if the system has a different structure or includes equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

Figure 5:
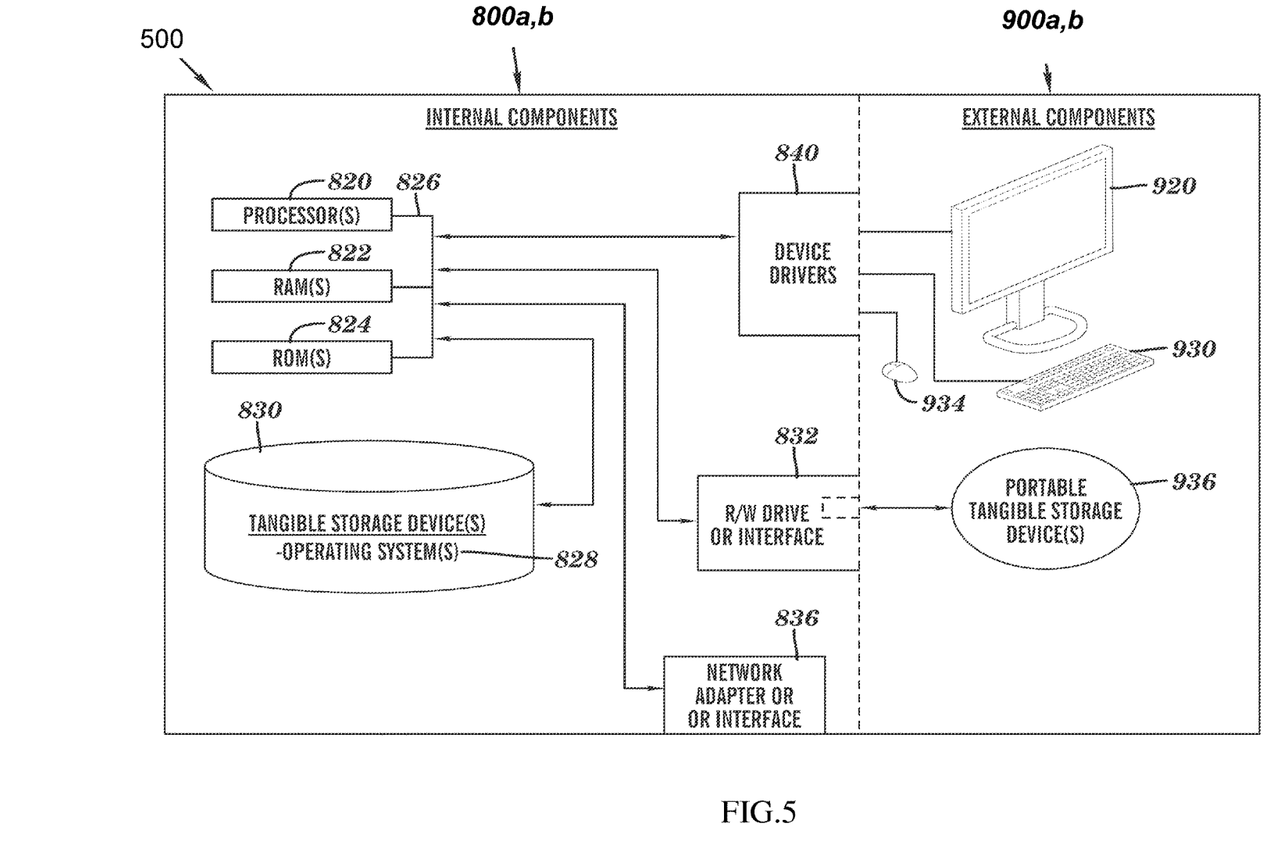
FIG. 5 shows a block diagram of internal and external components of computers and servers depicted in FIG. 1 according to an embodiment of the present disclosure.

Referring now to FIG. 5, a block diagram 500 of internal and external components of the computers depicted in FIG. 1 is shown, according to an embodiment of the present disclosure. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Clients 105 and servers 110 (FIG. 1) may include respective sets of internal components 800 *a, b* and external components 900 *a, b* illustrated in FIG. 5. Each of the sets of internal components 800 *a, b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs, may be stored on one or more computer-readable tangible storage devices 830 for execution by one or more processors 820 via one or more RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. The program software in clients 105 and servers 110 (FIG. 1) can be stored on one or more of the respective portable computer-readable tangible storage devices 936, read via the respective R/W drive or interface 832 and loaded into the respective hard drive 830.

Each set of internal components 800 *a, b* may also include network adapters (or switch port cards) or interfaces 836 such as a TCP/IP adapter cards, wireless Wi-Fi interface cards, or 3G or 4G wireless interface cards or other wired or wireless communication links. The program software in clients 105 and servers 110 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the software program in clients 105 and servers 110 (FIG. 1) are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

We claim:

1. A method for sharing information in a computing infrastructure, the method comprising:
    intercepting a message sent from a computing machine of a first user to at least one second user;
    verifying a sharing permission for sharing a content of the message, the sharing permission comprising one or more user-defined sharing rules defining policies for sharing the content of the message;
    based on the sharing permission being verified, prompting, by displaying a pop-up window, the first user to authorize the sharing of the content of the message;
    based on the sharing of the content of the message being authorized by the first user, adding a sharing indicator to the message, the sharing indicator comprising a custom sharing tag added to a header of the message;
    based on the message comprising the sharing indicator, analyzing the content of the message to identify each matching context of one or more known contexts matching the content of the message, wherein each known context is defined by one or more keywords;
    using an analytics engine based on a language processor to calculate a matching index for each known context according to a corresponding keyword comprised in a body of the message;
    identifying each known context comprising a matching index higher than a threshold value as a matching context of the message;
    organizing each known context comprising the matching index higher than the threshold value in a decreasing order of matching index;
    extracting information from the body of the message starting with a known context having the highest matching index, the information comprising one or more questions and associated answers corresponding to the matching context, the information being extracted by implementing a text parser;
    generating at least one shared entry for each matching context according to the extracted information corresponding to the matching context;
    selecting at least one collaborative system for each shared entry from a plurality of known collaborative systems according to a comparison between one or more characteristics of the shared entry and one or more characteristics of each known collaborative system, wherein the one or more characteristics of the shared entry comprise a language of the shared entry, the matching context and a complexity of the shared entry, and the one or more characteristics of each known collaborative system comprise a language of each known collaborative system, a topic, and a type of participants of the known collaborative system;
    formatting each generated shared entry for the at least one collaborative system by enclosing its contents into a block providing an indication of the topic and details of a member; and
    submitting each formatted shared entry for publication to the at least one collaborative system corresponding to the matching context of the shared entry.

2. The method according to claim 1, further comprising:
    conditioning analyzing the content of the message, generating at least one shared entry and submitting each formatted shared entry to a result of the verification of the sharing permission.

3. The method according to claim 1, wherein verifying the sharing permission comprises:
    verifying the sharing indicator comprised in the message.

4. The method according to claim 1, further comprising:
    verifying whether all matching contexts have been processed.

5. The method according to claim 1, wherein adding the sharing indicator comprises:
    adding the sharing indicator to the message according to one or more sharing rules and according to a sharing command submitted by the first user.

6. The method according to claim 1,
    wherein selecting the at least one collaborative system for each shared entry comprises:
    comparing characteristics of the shared entry to characteristics of each known collaborative system, the characteristics of the shared entry comprising language, matching context and complexity, and the characteristics of each known collaborative system comprising language, topics and type of participants; and
    calculating a relevance index as a normalized weighted sum of relevance parameters based on corresponding characteristics of the shared entry and the known collaborative systems, the relevance parameters comprising:
        a first relevance parameter based on comparing the language of the shared entry to the language of each of the known collaborative systems;
        a second relevance parameter based on comparing the matching context of the shared entry to the topic of each of the known collaborative systems; and
        a third relevance parameter based on comparing the complexity of the shared entry to the type of participants of each of the known collaborative systems.

7. The method according to claim 1, wherein the message is an e-mail.

8. The method according to claim 1, wherein the message comprises a conversation thread.

9. The method according to claim 1, wherein the at least one collaborative system comprises at least one online forum.

10. The method according to claim 9, wherein the at least one collaborative system comprises at least one discussion thread of each of the at least one online forum.

11. A computer program product for sharing information in a computing infrastructure, the computer program product comprising a non-transitory computer readable storage medium having program instructions embodied therewith, the program instructions executable by a computing system to cause the computing system to carry out a method comprising:
intercepting a message sent from a computing machine of a first user to at least one second user;
verifying a sharing permission for sharing a content of the message, the sharing permission comprising one or more user-defined sharing rules defining policies for sharing the content of the message;
based on the sharing permission being verified, prompting, by displaying a pop-up window, the first user to authorize the sharing of the content of the message;
based on the sharing of the content of the message being authorized by the first user, adding a sharing indicator to the message, the sharing indicator comprising a custom sharing tag added to a header of the message;
based on the message comprising the sharing indicator, analyzing the content of the message to identify each matching context of one or more known contexts matching the content of the message, wherein each known context is defined by one or more keywords;
using an analytics engine based on a language processor to calculate a matching index for each known context according to a corresponding keyword comprised in a body of the message;
identifying each known context comprising a matching index higher than a threshold value as a matching context of the message;
organizing each known context comprising the matching index higher than the threshold value in a decreasing order of matching index;
extracting information from the body of the message starting with a known context having the highest matching index, the information comprising one or more questions and associated answers corresponding to the matching context, the information being extracted by implementing a text parser;
generating at least one shared entry for each matching context according to the extracted information corresponding to the matching context;
selecting at least one collaborative system for each shared entry from a plurality of known collaborative systems according to a comparison between one or more characteristics of the shared entry and one or more characteristics of each known collaborative system, wherein the one or more characteristics of the shared entry comprise a language of the shared entry, the matching context and a complexity of the shared entry, and the one or more characteristics of each known collaborative system comprise a language of each known collaborative system, a topic, and a type of participants of the known collaborative system;
formatting each generated shared entry for the at least one collaborative system by enclosing its contents into a block providing an indication of the topic and details of a member; and
submitting each formatted shared entry for publication to the at least one collaborative system corresponding to the matching context of the shared entry.

12. The computer program product of claim 11, further comprising:
conditioning analyzing the content of the message, generating at least one shared entry and submitting each formatted shared entry to a result of the verification of the sharing permission.

13. The computer program product of claim 12, wherein verifying the sharing permission comprises:
verifying the sharing indicator comprised in the message.

14. The computer program product of claim 11, further comprising:
verifying whether all matching contexts have been processed.

15. The computer program product of claim 11, wherein adding the sharing indicator comprises:
adding the sharing indicator to the message according to one or more sharing rules and according to a sharing command submitted by the first user.

16. The computer program product of claim 11, wherein selecting the at least one collaborative system for each shared entry comprises:
comparing characteristics of the shared entry to characteristics of each known collaborative system, the characteristics of the shared entry comprising language, matching context and complexity, and the characteristics of each known collaborative system comprising language, topics and type of participants; and
calculating a relevance index as a normalized weighted sum of relevance parameters based on corresponding characteristics of the shared entry and the known collaborative systems, the relevance parameters comprising:
a first relevance parameter based on comparing the language of the shared entry to the language of each of the known collaborative systems;
a second relevance parameter based on comparing the matching context of the shared entry to the topic of each of the known collaborative systems; and
a third relevance parameter based on comparing the complexity of the shared entry to the type of participants of each of the known collaborative systems.

17. A method for sharing information in a computing infrastructure, the method comprising:
intercepting an email message;
verifying a sharing permission for sharing a content of the email message, the sharing permission comprising one or more user-defined sharing rules defining policies for sharing the content of the email message;
based on the sharing permission being verified, prompting, by displaying a pop-up window, the first user to authorize the sharing of the content of the email message;
based on the sharing of the content of the email message being verified, adding a sharing tag to the email message;
based on the email message comprising the sharing tag, analyzing the content of the email message to identify a context from a repository of known contexts;
using an analytics engine based on a language processor to calculate a matching index for each known context according to a corresponding keyword comprised in a body of the email message;

identifying each known context comprising a matching index higher than a threshold value as a matching context of the email message;

organizing each known context comprising the matching index higher than the threshold value in a decreasing order of matching index;

extracting content from the email message associated with the identified matching context starting with a known context having the highest matching index, the content comprising one or more questions and associated answers corresponding to the matching context, the information being extracted by implementing a text parser;

generating a precursor post from the extracted content for the identified matching context;

selecting a forum corresponding to the identified matching context based on a comparison between characteristics of the precursor post and characteristics of known forums wherein the characteristics of the precursor post comprise a language of the precursor post, the matching context and a complexity of the precursor post and the characteristics of the known forums comprise a language of the known forums, a topic and a type of participants of the known forums;

formatting the generated precursor post by enclosing its contents into a block providing an indication of the topic and details of a member of the selected forum; and submitting the formatted precursor post to the selected topic of the corresponding selected forum using the credentials of the member.

* * * * *